United States Patent [19]
Heidtmann

[11] 3,864,844
[45] Feb. 11, 1975

[54] SOLID STATE DRYER CONTROL
[75] Inventor: Donald S. Heidtmann, Louisville, Ky.
[73] Assignee: General Electric Company, Louisville, Ky.
[22] Filed: Oct. 26, 1973
[21] Appl. No.: 409,908

[52] U.S. Cl............................. 34/45, 34/48, 34/55
[51] Int. Cl............................................. F26b 19/00
[58] Field of Search ................ 34/55, 53, 48, 46, 45

[56] References Cited
UNITED STATES PATENTS

| | | | |
|---|---|---|---|
| 3,224,107 | 12/1965 | Chapee | 34/46 |
| 3,331,139 | 7/1967 | Finnegan et al. | 34/45 |
| 3,381,226 | 4/1968 | Jones et al. | 219/501 |
| 3,394,466 | 7/1968 | Heidtmann | 34/53 |
| 3,398,460 | 8/1968 | Elders | 34/55 |
| 3,409,994 | 11/1968 | Menk | 34/45 |
| 3,475,830 | 11/1969 | Sutton et al. | 34/45 |
| 3,499,230 | 3/1970 | Slugantz | 34/45 |
| 3,758,959 | 9/1973 | Karklys | 34/45 |

Primary Examiner—Charles J. Myhre
Assistant Examiner—Paul Devinsky

[57] ABSTRACT

A system for controlling the operation of the drive motor and heater elements of a dryer. The system includes a dryness-sensing circuit, a cool-down control and a heater-temperature control. The cool-down control and the heater-temperature control monitor the status of a common, heat-sensitive transducer, the heater-temperature control serving to maintain the temperature within the dryer at a predetermined level by controlling current flow to a heater element, and the cool-down control serving to terminate the operation of the dryer upon reception of signals from both the dryness-sensing control and the heat-sensitive transducer which indicate both a satisfactory value of fabric dryness and an acceptably low temperature level.

4 Claims, 2 Drawing Figures

SOLID STATE DRYER CONTROL

BACKGROUND OF THE INVENTION

1. Field of the Invention

The present invention relates to fabric drying apparatus and more particularly, to a system for controlling the operation of such apparatus.

2. Description of the Prior Art

It has long been recognized that fabric dryers for home use may advantageously be provided with mechanisms for automatically controlling the operation of the dryer. Such mechanisms commonly serve to terminate the operation of a dryer after taking into account various parameters such as fabric dryness and temperature. Of prime importance, of course, is the requirement that fabrics disposed within the dryer must have reached a satisfactory value of dryness before operation of the dryer is terminated. Also of great importance for permanent press fabrics is the continued tumbling of the clothes after the heat is terminated until the temperature within the dryer has declined to a satisfactory level such that the fabrics do not wrinkle. It is thus desirable to provide a control which allows the tumbling operation of the dryer to continue until the desired values of both dryness and temperature are attained. In the prior art, this has been accomplished in several ways, one of which is to provide a thermostatic device monitored by a master control, the status of the device determining whether dryer temperature had decreased to a suitably low value such that the master control will operate. A dryness sensing device is also commonly provided for transmitting a signal through the master control when the fabrics within the dryer are determined to have attained a predetermined degree of dryness. A heater temperature control is also provided along with a second thermostatic device which supplies the temperature control with a signal for indicating whether the temperature within the dryer is above or below a predetermined value. As the temperature within the dryer rises above a predetermined level, current to the heater element is shut off by the heater control and not allowed to resume until the temperature falls to a level sufficiently low to reactivate the thermostats. The large operating differential and the thermal mass of today's thermostats produce large fluctuations in dryer temperature with the resulting inability to maintain a constant, pre-determined temperature level.

While the system described above generally fulfills the basic requirements for automatic dryer operation, the use of separate thermostatic devices for the master control and for the heater temperature control make inevitable some discrepancy between the actuation temperature of the master control and that of the heater temperature control. More importantly, the thermostatic devices used display an inherent lag, or hysteresis, in their operation due to the differential existing between the temperatures required to activate and de-activate the devices. Thermostatic devices as used in prior dryer controls generally operate in a first mode, for instance to open a switch, when the temperature rises past a maximum value. The devices, however, do not enter the opposite mode, in this case to reclose the switch, until the temperature falls to a value significantly beneath the aforementioned maximum value. While this characteristic may be desirable to prevent the rapid oscillation of mechanical contacts which often leads to arcing, breakage and rapid wear, some efficiency and a considerable degree of accuracy of control is sacrificed.

By my invention, there is provided an improved solid-state, dryer control that is highly efficient, accurate and dependable.

SUMMARY OF THE INVENTION

In accordance with the present invention, there is provided in a fabric dryer of the type having a rotatable drum for tumbling fabrics including drive means for rotating of the drum and heating means, means for controlling the operation of the dryer. First sensing means are provided for detecting the moisture content of fabrics disposed within the dryer, the first sensing means producing a signal when the moisture content has declined to a predetermined value. Transducer means are provided for sensing the temperature within the dryer and producing a signal representative thereof. First control means are provided for receiving the signals produced by the first sensing means and the transducer means, the first control means regulating the operation of the heating means in response to signals received from the transducer means, the first control means further acting to de-energize the heating means upon reception of the signal produced by the first sensing means. Second control means are provided for receiving the signals produced by the first sensing means and the transducer means, the second control means acting to terminate the operation of the drive means upon reception of signals from both the first sensing means and the transducer means.

It is an object of the present invention to provide a control system for a dryer which requires no mechanical or electromechanical temperature sensing elements for normal operation.

It is a further object to provide a dryer control system having temperature sensing means which display a negligible hysteresis characteristic.

It is a further object to provide a dryer control system including a master control and a temperature control which utilize a common heat sensitive transducer.

DESCRIPTION OF THE PREFERRED EMBODIMENT

Figure 1:
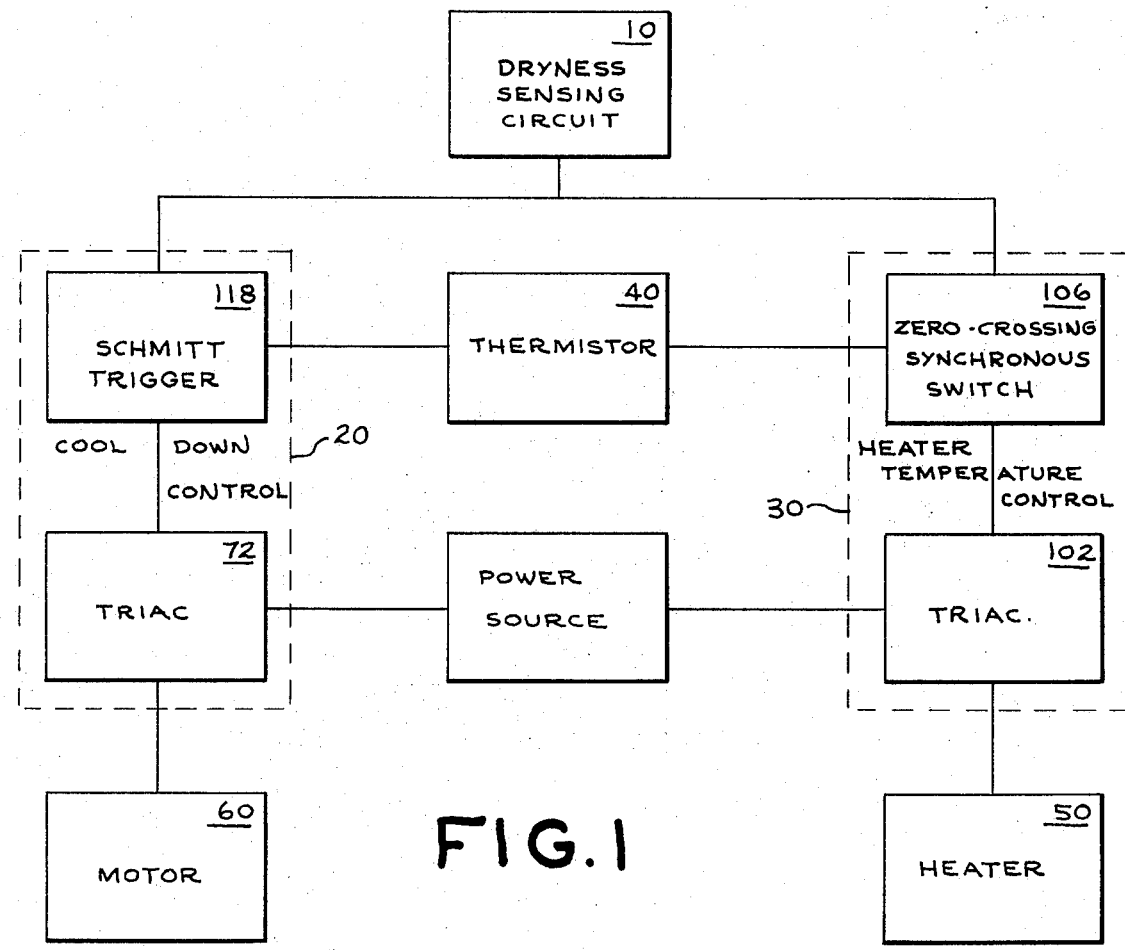
FIG. 1 is a functional block diagram representative of the dryer control system embodying the principles of the present invention.

Referring briefly to FIG. 1, there is shown a functional block diagram representative of the dryer control system embodying the principles of the present invention. In operation, the output of clothes dryness sensing circuit 10 is fed to the cool-down control circuit 20 and the heater temperature control circuit 30. The voltage from the thermistor voltage divider circuit 40 is also fed to both control circuits (20 and 30). The dryer control circuit logic is as follows:

1. The heater control circuit 30 applies voltage to the heater 50 if there is no signal from the dryness sensing circuit 10 (the clothes are not dry) and the voltage from the thermistor divider circuit 40 indicates the dryer temperature is below the set point.

2. The cool-down control circuit 20 applies voltage to the motor 60 as long as there is no signal from the dryness sensing circuit 10 (the clothes are not dry) and/or a high voltage from the thermistor divider circuit 40 indicates the dryer temperature is high.

Figure 2:
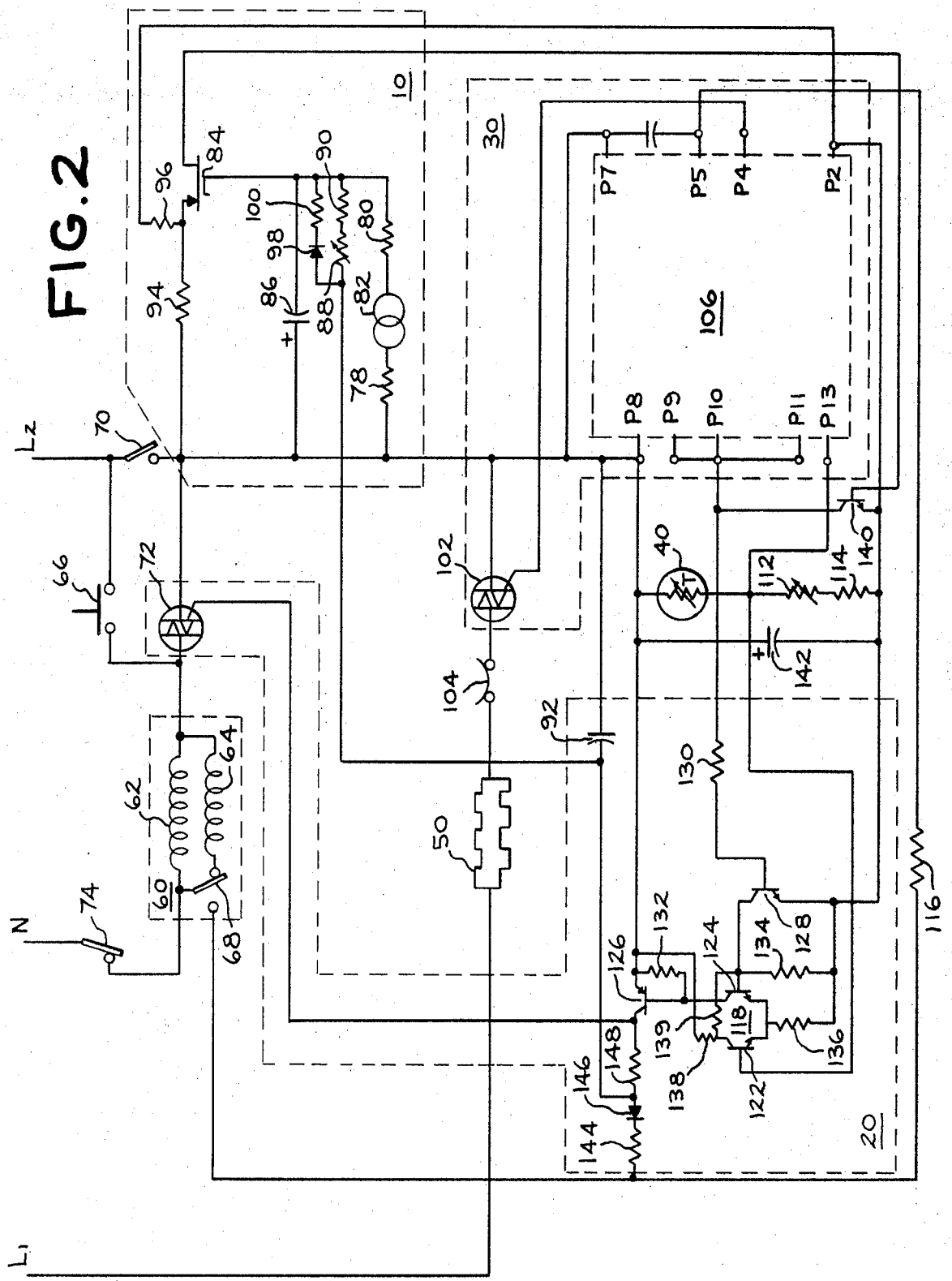
FIG. 2 is a schematic diagram showing, in detail, a dryer control system embodying the principles of the present invention.

Referring to FIGS. 1 and 2, drive means such as a motor generally indicated at 60 and incorporating run and start windings 62 and 64 respectively is provided for operating a blower (not shown) and for rotating a drum (also not shown) which retains and tumbles items to be dried in a fabric dryer. A switch 66 advantageously comprises a spring-biased, normally open switch which is manually closed to allow current to flow from one side of a source of AC power, here denominated L2, through the motor windings to the other side of the power source which is represented as neutral, or N. In accordance with normal practice in the home appliance field, it will be understood that the circuit shown may advantageously be supplied by a three-wire source including a pair of lines L1 and L2, each of which has impressed upon it a 120 volt AC waveform, the waveforms being 180° out of phase with respect to one another. The voltage thus supplied between L1 and L2 and to neutral, indicated as N, is 120 volts, while the voltage between L1 and L2 is approximately 240 volts.

The 120 volt signal, now impressed across both start and run windings of motor 60, energizes the motor and causes the blower and the dryer drum to rotate. Upon rotation, centrifugal switch 68 closes, disconnecting the start winding and completing a connection between neutral line N and the control circuitry for applying a reference potential thereto. Centrifugal switch 70 closes, effectively shunting switch 66 and applying AC voltage derived from L2 to the control circuitry and to run winding 62 by way of a gated bilateral switch such as thyristor or Triac 72. Switch 74 is a mechanical switch which is operated by the dryer door, serving to disconnect the entire control system and motor from the neutral line N such that dryer operation will terminate upon the opening of the door.

Heating means such as heating element or heater 50 provides I²R heating for drying fabrics disposed within the dryer.

In accordance with the present invention, means are provided for controlling the operation of the fabric dryer including first sensing means such as dryness sensing circuit 10. Circuit 10 includes a pair of resistors 78 and 80 and a sensor 82, which may advantageously take the form of two or more electrical contacts which are physically separated and placed within the drum of the dryer for contacting fabrics disposed therein. Circuit 10 also includes a high input impedance, switchable element such as FET 84, a capacitor 86, and a series resistive network 88 and 90 from the negative side of a DC power-supply filter capacitor 92 for determining the RC time constant of the sensing circuit. Variable resistor 88 is a customer adjustable control to set the desired degree of dryness.

The resistors 94 and 96 comprise a voltage dividing network to bias the source terminal of FET 84 and determine the voltage to which capacitor 86 must charge before the FET 84 conducts and signals that the clothes are dry. A diode 98 coupled serially with a resistor 100 facilitate the rapid discharge of capacitor 92 when the dryer door, and thus switch 74 is opened and power-supply filter capacitor 92 is deenergized.

First control means such as heater temperature control 30 includes a first gated bilateral switch such as thyristor or Triac 102. Heater temperature control 30 serves to energize Triac 102 to allow current to flow through heater 50. It will be seen that Triac 102 and heater 50 are connected between lines L1 and L2 in series with a safety thermostatic circuit breaker 104 such that when Triac 102 is operative, the full line to line voltage existing between L1 and L2 is impressed across heater 50. Also included as a portion of heater temperature control 30 is a zero-voltage triggering or zero-crossing, synchronous switching circuit 106 which, when energized, transmits enabling pulses to the gate terminal of Triac 102 each time the AC voltage between L2 and N crosses the zero axis. Switching circuit 106 may be of the type described in U.S. Pat. No. 3,381,226 — Jones et al assigned to the same assignee as the present invention and may be in the form of an integrated circuit such as that designated PA424 by the Semiconductor Products Dept. of the General Electric Company, Syracuse, New York, and described in a GE publication, Zero Voltage Switch, 85.21, of March, 1969. Circuit 106 is provided with a plurality of numbered pins, designated in FIG. 2 by numerals prefixed by the letter "P".

Transducer means such as a temperature sensitive transducer or thermistor 40 is provided for sensing the temperature within the dryer and producing a signal representative thereof. Thermistor 40 is connected in series with a pair of resistors 112 and 114, the series circuit thus constituted being coupled between L2 and pin P2 of the zero-voltage trigger circuit 106. P5 is coupled to P7 through a capacitor 117, line N by means of a resistor 116 and may be considered to be a point of ground or reference potential. Resistor 112 has been provided as variable to serve as a control for the user to set the clothes drying temperatures.

Second control means such as cool-down control circuit 20 comprises a Schmitt trigger 118 including transistors 122 and 124 which act to selectively enable or disable transistor 126. Transistor 128 disables the Schmitt trigger as long as voltage is on P10 of switching circuit 106. Also included in circuit 20 is a second gated bilateral switch, such as Triac 72 for controlling current flow to motor 60 and resistors 130, 132, 134, 136, 138, and 139.

Switch means such as transistor 140 is operatively connected to a bus which ties together pins P9, P10 and P11 of switching circuit 106 and a point of reference potential and is adapted to be energized upon reception of a signal from dryness sensing circuit 10 for shunting the bus, and thus P9, P10 and P11 to reference potential. A capacitor 142 is connected in shunt across the series combination of thermistor 40 and resistors 112 and 114 and constitutes a source of DC potential for the zero voltage trigger circuit 106. The rectified, regulated voltage source for capacitor 142 is from N and L2 to dropping resistor 116 and the rectifiers and zener diode in trigger circuit 106.

Switch biasing capacitor 92 is coupled between L2 and N by means of resistor 144 and diode 146. Capacitor 92 thus accumulates a DC voltage across its plates, the plate which is coupled to diode 146 assuming a negative polarity with respect to L2. The negative polarity plate of capacitor 92 is also connected to the resistive network provided within dryness sensor 10 and is coupled by means of resistor 148 to the gate terminal of a gated bilateral switch such as Triac 72. The DC voltage afforded by capacitor 92 provides a continuous negative bias to the gate of Triac 72, maintaining the conductivity of the switch until such time as transistor 126 is enabled for shunting the gate terminal of the Triac 72 to L2, deenergizing the Triac thereby removing voltage from the motor 60 which stops, causing centrifugal switches 68 and 70 to open, thereby removing all voltage from the control circuit.

The operation of the present circuit will now be described, with reference to the elements set forth above. When it is desired to dry a mass of damp or wet fabrics, the fabrics are placed within the rotatable drum of the dryer and the door is closed. It will be assumed for purposes of illustration that, before startup, the interior of the dryer is initially at a relatively low temperature, and the fabrics therein sufficiently wet to avoid disablement of the system by dryness sensing circuit 10. Closure of the dryer door closes switch 74 so as to connect one end of the start and run windings of motor 60 to neutral or reference potential N. Switch 66 is now manually depressed, connecting both start and run winding 64 and 62, respectively, of motor 60 between L2 and N. As the motor 60 begins to rotate the drive mechanism of the dryer, centrifugal switches 68 and 70 close, disconnecting start winding 64 and connecting lines L2 and N across the control system circuitry. Further, upon closure of switch 70, a series circuit comprising Triac 72 and run winding 62 is connected between L2 and N. Current flows through diode 146 and associated resistor 144, charging capacitor 92 and providing a continuous negative potential to the gate terminal of Triac 72 for continuing the energization of Triac 72 and thus the operation of motor 60 until the drive cycle is terminated by the turning on of transistor 126.

As soon as switch 70 closes, line voltage is applied to pins P7 and P8 of switching circuit 106. Similarly, the closure of switch 68 connects pin P5 to the reference potential through dropping resistor 116. Switching circuit 106 immediately becomes operative. Under startup conditions, the interior of the dryer is at a relatively low temperature and as will be understood by those skilled in the art, the resistance of temperature sensing thermistor 40 is relatively high. The voltage drop across thermistor 40 is sufficient to reverse bias portions of circuit 106 causing current to be transmitted to the gate terminal of Triac 102. Triac 102 immediately becomes conductive, passing current to heating elements 50 for raising the temperature within the dryer. As the temperature within the dryer increases, the resistive value of thermistor 40 declines until the voltage drop it affords is insufficient to back bias the appropriate portions of circuit 106 and Triac 102 is then disabled. Since the resistance of thermistor 40 changes continuously as a function of temperature, rather than in discrete jumps or steps, minute changes in temperature are reflected by the voltage drop thereacross. A slight decrease in temperature can thus cause the voltage across thermistor 40 to change sufficiently to affect circuit 106 to reinstate current flow through heater 50. In this manner, the temperature within the dryer undergoes very small excursions from the desired value.

During the initial stages of the operation of the dryer, cool-down control circuit 20 is dormant. Transistor 126 remains non-conductive, allowing Triac 72 to remain conductive for continuing the operation of motor 60. It will be seen that in order for transistor 126 to be biased to a state of non-conduction, transistor 124 must also be rendered non-conductive. This is accomplished by a means of transistor 128, which, when conductive, shunts the base terminal of transistor 124 to the negative side of the power source provided by capacitor 142. Since transistors 122 and 124 constitute a Schmitt trigger 118, either transistor 122 or 124 may conduct, the conduction of one precluding the conduction of the other. In this manner, when transistor 122 is biased into conduction, transistor 124 is disabled, resulting in the non-conduction of transistor 126 and allowing Triac 72 to be energized for operating motor 60. Conversely, in order to disable Triac 72 and thus terminate the operation of the dryer, transistor 126 must be enabled. To enable transistor 126, transistor 124 must be made conductive. To do this, it is necessary to disable transistor 128, this being accomplished by the shunting of the base terminal to N by means of transistor 140. With transistor 128 disabled, it will be seen that transistor 124 is capable of becoming conductive and enabling transistor 126, however, depending upon the state of transistor 122. Transistor 122 is resistively coupled across thermistor 40 such that the voltage drop across the thermistor determines the bias impressed upon the base-emitter junction of transistor 122. If the voltage drop across thermistor 40 is of sufficient magnitude, corresponding to a "cool" condition within the dryer, transistor 122 will be disabled, allowing transistors 124 and 126 to conduct, disabling Triac 72. If, however, the dryer is at a relatively high temperature, thermistor 40 will have a low resistance and thus the voltage drop across resistors 112 and 114 is large enough to maintain transistor 122 in a conducting state. This keeps transistor 124 disabled so that Triac 72 will continue to pass current through the windings of motor 60.

Returning now to dryness sensing circuit 10, as long as conduction is sustained through sensor 82 by the damp clothes within the dryer drum, capacitor 86 is prevented from accumulating sufficient voltage to energize FET 84. As the fabrics dry, less and less current is transmitted by sensor 82, and capacitor 86 eventually accumulates a voltage sufficient to bias FET 84 into a state of conduction. Current transmitted by FET 84 is injected into the base terminal of transistor 140 which becomes conductive and shunts the base terminal of transistor 128 to neutral, causing transistor 128 to become non-conductive.

The temperature within the dryer at this time will be rather high, having been maintained at a predetermined operating temperature by heater temperature control 30. Under these conditions, the voltage drop across thermistor 40 will be small and the voltage drop across resistors 112 and 114 will be large, which will maintain transistor 122 of cool-down control circuit 20 in conduction. Transistor 126 will continue to be disabled, maintaining the negative bias on the gate terminal of Triac 72 allowing motor 60 to continue to operate. It will now be apparent that unless heater temperature control 30 is disabled when the fabrics are dry, it will continue to maintain the temperature within the dryer at its predetermined operating level indefinitely. For this reason, transistor 140 also is connected to pins P9, P10 and P11 of zero-crossing synchronous switching circuit 106. When transistor 140 becomes conductive due to the energization of FET 84, the transmission of triggering signals to the gate terminal of Triac 102 from switching circuit 106 are discontinued. Current flow through heating element 50 now ceases, and the dryer interior begins to cool. In other words, the conduction of FET 84 causes the dryness sensing circuit 10 to indicate that the clothes are dry, which in turn causes transistor 140 to conduct. This removes voltage from a portion of the switching circuit 106 and from transistor 128 thereby disabling switching circuit 106 to turn off the heat and enables Schmitt trigger 118 such that it can shut off motor 60 after cool-down.

Should sensor 82 of the dryness sensing circuit 10 encounter fabrics during cooldown which are damp enough to conduct sufficient current for discharging capacitor 86 thereby removing the bias from the gate terminal of FET 84, transistor 140 will again be disabled. Transistor 128 will resume conduction, disabling transistor 124 and allowing current to continue to flow through motor 60. Further, a portion of switching circuit 106 will be enabled such that circuit 106 again puts forth triggering impulses for energizing Triac 102, allowing current flow through heating element 50 to resume. Essentially then, the entire control system is still operative even during the cool-down mode.

In the absence of such an occurrence, heating element 50 remains disabled and the decreasing temperature within the dryer causes the resistance of thermistor 40 to increase. The increased resistance of thermistor 40 creates a greater voltage drop thereacross and a smaller drop across resistors 112 and 114 which eventually causes Schmitt trigger 118 to operate, disabling transistor 122 and allowing transistor 124 to become conductive. Transistor 126 is thus energized, shunting the gate terminal of Triac 72 to L2 and causing the operation of motor 60 to cease.

It can now be seen that the present invention provides the advantages of both an improved cool-down control, which terminates the operation of the dryer only when predetermined values of fabric dryness and temperatures are met, and a common temperature sensing device serving both a heater control and the cool-down control. Further, the rapid, practically instantaneous response of the solid-state elements utilized in conjunction with an infinitely variable temperature sensor serves to maintain the termperature within the dryer within limits not attainable by prior art thermostatic devices.

Components satisfactory in the illustrated embodiment of the present invention are:

| | |
|---|---|
| 78,80 Resistor | 330 K ohms |
| 86 Capacitor | 8 μf/100 V |
| 88 Resistor | 0–50 M ohms |
| 90 Resistor | 40 M ohms |
| 92 Capacitor | 10 μf/150 V |
| 94 Resistor | 10 K ohms |
| 96 Resistor | 22K ohms |
| 100 Resistor | 1 M ohms |
| 112 Resistor | 0–20K ohms |
| 114 Resistor | 15 K ohms |
| 116 Resistor | 8 K ohms, 3 W |
| 117 Capacitor | .005 |
| 130 Resistor | 150 K ohms |
| 132 Resistor | 1500 ohms |
| 134 Resistor | 47 K ohms |
| 136,138 Resistor | 2200 ohms |
| 139 Resistor | 68 K ohms |
| 142 Capacitor | 100 μf/15 V |
| 144 Resistor | 100 ohms |
| 148 Resistor | 5 K ohms, 5 W |

It will be evident from the foregoing description that certain aspects of the invention are not limited to particular details of the illustrated embodiment. For instance, other types of dryness sensors and control elements associated therewith may be substituted for those shown in the present embodiment. Similarly, the zero crossing synchronous switching circuit utilized to trigger a Triac lying in series with a heating element, and the Schmitt trigger circuit provided to disable the Triac lying in series with the drive motor, could be replaced by equivalent devices.

It should be apparent to those skilled in the art that the embodiment described heretofore is considered to be the presently preferred form of this invention. In accordance with the Patent Statutes, changes may be made in the disclosed apparatus and the manner in which it is used without actually departing from the true spirit and scope of this invention.

What is claimed is:

1. In a fabric dryer of the type having a rotatable drum for tumbling fabrics and including heating means and drive means for rotating said drum, solid-state means for controlling the operating of said dryer comprising:

first sensing means including a moisture sensor, charging capacitor and switch for detecting the moisture content of fabrics disposed within said dryer, said first sensing means producing a signal when said moisture content has declined to a predetermined value;

transducer means for sensing the temperature within said dryer and producing a signal repesentative thereof;

first control means including a zero-voltage switch for receiving said signals produced by said first sensing means and said transducer means, said first control means regulating the operation of said heating means in response to signals received from said transducer means, said first control means further including a first gated bilateral switch for controlling current flow to said heating means and acting to de-energize said heating means upon reception of said signal produced by said first sensing means; and second control means including voltage-level sensing trigger means for receiving said signals produced by said first sensing means and said transducer means, said second control means including a second gated bilateral switch for controlling current flow to said drive means and acting to terminate the operation of said drive means upon reception of signals from both said first sensing means and said transducer means.

2. A solid-state control system for a fabric dryer of the type having a rotatable drum for tumbling fabrics, said dryer including heating means and drive menas for rotating said drum, comprising:

first sensing means including a moisture sensor, charging capacitor and switch for sensing the moisture content of fabrics disposed within said dryer, said first sensing means producing a signal when said moisture content has declined to a predetermined value;

transducer means for sensing the temperature within said dryer, said transducer means producing a continuous signal, the magnitude of said signal representing the level of the temperature;

solid-state switch means to receive said signal produced by said first sensing means, said switch means being actuated upon reception of said signal;

first control means including a solid-state zero-crossing, synchronous switch for receiving said signal produced by said transducer means, said first control means including a first gated bilateral switch for controlling current flow to said heating means and being operative to regulate said heating means in response to said signal, said first control means further being coupled to said switch means for de-energizing said heating means upon the actuation of said switch means; and second control means including a solid-state voltage-level sensor trigger means for receiving said signal produced by said transducer means, said second control means further being coupled to said switch means, said second control means including a second gated bilateral switch for controlling the current flow to said drive means and being operable to de-energize said drive means upon actuation of said switch means and upon reception of a signal from said transducer means representing a temperature whose level is below a predetermined value.

3. A control system as defined in claim 1 wherein said control system is energized by alternating voltage, and wherein said first control means is operable to energize said first gated bilateral switch each time said alternating voltage undergoes a change in polarity.

4. A control system as defined in claim 3 wherein said transducer means comprises a temperature-sensitive resistive element to be connected to a source of direct current, the voltage drop occuring across said resistive element representing the temperature within the dryer.

* * * * *